United States Patent Office 3,487,621
Patented Jan. 6, 1970

3,487,621
GAS-LIQUID CONTACT APPARATUS
Georges Bichet, Rousillon, and Pierre Joseph Frechet, Caluire, France, assignors to Rhone-Poulenc S.A., Paris, France, a French body corporate
Filed May 23, 1967, Ser. No. 640,600
Claims priority, application France, May 25, 1966, 62,972
Int. Cl. B01d 47/02
U.S. Cl. 55—228   5 Claims

ABSTRACT OF THE DISCLOSURE

The invention provides a gas-liquid contact apparatus in which a gas-liquid separator chamber has at least one pair of horizontal tubes connected tangentially thereto, one such tube being connected at a point higher than the other. Elbow tubes connect the horizontal tubes to the vertical arms of at least one U-tube. Gas may be injected upwardly at the bottom of one of the vertical arms and liquid introduced e.g. at the top of the other arm. If solids are present e.g. as a catalyst, the chamber may be connected to a decanter.

---

The present invention relates to gas-liquid contact apparatus, permitting the contact of gases and liquids, which may or may not take place in the presence of a solid material in suspension in the liquid phase.

It is known to disperse gases in liquids, either in order to bring about a reaction between the dispersed phase and the continuous phase, or in order to effect a physical exchange between the two phases. In one case it is expedient to effect a maximum exchange of material and in the other to obtain as near physical equilibrium conditions as possible. In all cases this object is achieved only by effecting as extensive a contact as possible between phases, and therefore by dividing the gaseous phase to the maximum extent, and simultaneously increasing the concentration of the liquid phase in the gaseous phase.

Furthermore, when contact has taken place between a liquid phase and a gaseous phase, it is generally expedient to separate the two phases subsequently, this being necessary when a gaseous product is formed, when the two phases contact e.g. in a chemical reaction or due to vaporisation. The continuous liquid phase freed from the gaseous phase can then be subjected to a new contact process.

To solve these various problems, liquid-circulation bubble columns are generally used. In such columns, the flow of the liquid takes place without any pumps and without mechanical agitaitng elements moving within the gas/liquid dispersion. The gas is generally dispersed in the liquid by passing through small orifices situated at the base of a column in which inter-phase contact takes place and at the top of the column the two phases are separated in a widened chamber, so as to reduce the speed of the liquid and thus to permit the gas bubbles which are lighter than the liquid to reach the surface. Liquid which is decanted then returns to the base of the contact column, for example through an annular space surrounding the contact column, the density difference between the gas/liquid dispersion column and the column of liquid producing a driving force sufficient to permit the flow of the liquid.

Such systems have many disadvantages including the use of devices such as perforated or sintered plates, clusters of tubes, for dividing the gaseous phase which complicates the construction of the apparatus, and are liable to become blocked either by solid particles, e.g. catalysts, in suspension in the medium or by solid or viscous materials formed in the course of a gas/liquid contact, which gives the apparatus a poor yield.

It is also found in these apparatus that the division of the gas is poor since during their travel upwards in the contact column, the gas bubbles re-group by coalescence, which may reduce to a considerable extent, the contact surface between the liquid and the gas. Moreover, since the gas/liquid separation is effected by simple decantation an apparatus of considerable volume which is full of liquid, is required for it to be effective. Owing to poor gas/liquid contact per unit of volume of the liquid contained in the apparatus, it is often necessary to make the reagents have a considerable period of dwell in the apparatus, which requires the use of a bulky apparatus to obtain a desired transformation.

It has been proposed to overcome these disadvantages of the hitherto known apparatus by creating turbulent currents within the liquid phase, in order to stabilise the dispersion of the gas in the liquid. However, the production of these turbulent currents always requires considerable additional energy to be supplied either by means of a pump, by nozzles, or by a mechanical agitating system. The use of these various systems is not altogether satisfactory since one has to use mechanical elements which often have to rotate in corrosive media, at high pressure and temperature. Furthermore such systems give rise to sealing problems.

According to the invention there is provided gas-liquid contact apparatus, such apparatus comprising a gas-liquid separation chamber having a gas outlet, at least one pair of approximately horizontal tubes connected to said chamber in a peripheral direction, one tube of the or each pair being connected to the chamber at a point higher than the other tube of such pair, and at least one U-tube having approximately vertical arms, a first arm of the or each U-tube being connected by an elbow tube to said one horizontal tube of the or each pair, the second arm being connected to said other horizontal tube of the or each pair, and gas and liquid inlets to the apparatus.

The apparatus according to the invention makes it possible to obtain a considerable contact surface between gas and liquid, without the assistance of any rotating part, while requiring only a small volume of liquid and a considerable turbulence throughout the apparatus, which avoids any risk of material being deposited.

In order that the invention will more clearly be understood the following description is given, merely by way of example, reference being made to the accompanying drawings, in which.

Figure 1:
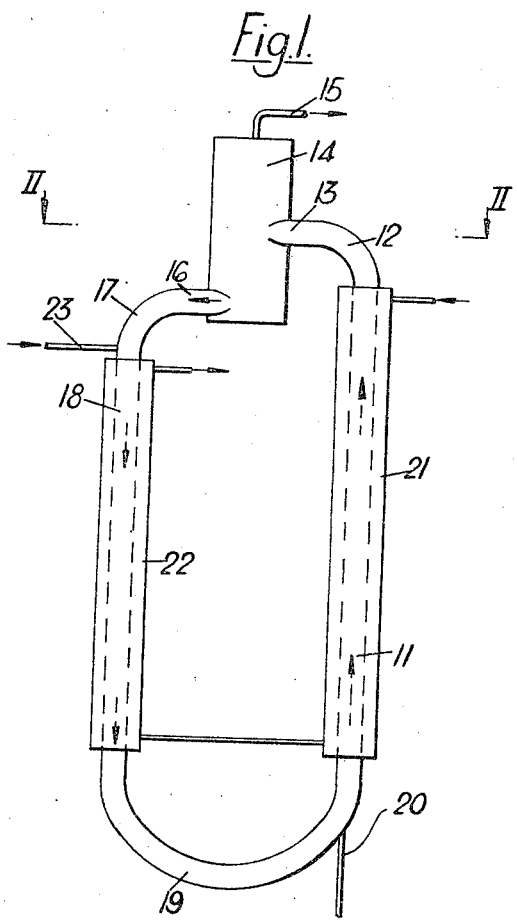
FIGURE 1 is a diagrammatic side elevation of one embodiment of apparatus according to the invention.
Figure 2:
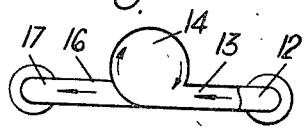
FIGURE 2 is a section taken on the line II—II of FIGURE 1.

The apparatus shown in FIGURE 1 comprises a first cylindrical approximately vertical tube 11 connected by an elbow tube 12 to a substantially horizontal tube 13, which is connected tangentially into a gas/liquid separator 14 in the form of a vertical cylinder whose diameter is greater than that of the tube 11. At the top of the separator 14, there is provided a gas outlet connection 15 for discharging gases or vapours. A second substantially horizontal tube 16 is connected tangentially to the separator at a point situated below the point of connection of the tube 13 and is connected by means of a further elbow tube 17 to a second substantially vertical tube 18. The two tubes 11 and 18 are connected by a substantially semi-circular portion 19 to form a U-tube.

At the base of tube 11 there is provided a gas inlet connection 20, and a liquid inlet 23 is connected to the upper end of the second vertical tube 18, as shown, or alternatively may be connected to separator chamber 14. Tubes 11 and 18 are surrounded with jackets 21 and 22 respectively, permitting the circulation of a cooling or heating fluid.

Generally speaking, the height of the first vertical tube 11 should be greater than 2 metres, and is preferably between 5 and 15 metres and its diameter is equal to or greater than 50 mm. The second vertical tube 18 can have the same or a different diameter, the higher the ratio of the diameters of the tubes 18 and 11, the higher is the driving force in the assembly. However, it is preferable for the ratio of the diameters of the tubes 18 and 11 to be such that the pressure loss in the whole U-tube assembly is minimal.

If the tubes 11 and 18 are not exactly vertical they are preferably inclined in such a manner that their axes converge downwardly.

The radii of curvature of the elbows 12 and 17 and of portion 19 are calculated in accordance with the usual rules of chemical engineering, so that the pressure loss in the material flowing through the general circuit is as low as possible.

The tubes 13 and 16 will normally be horizontal, but they may be given a slight inclination of up to 15° to the horizontal, with both tubes sloping downwardly from the separator 14. While the tube 16 is connected to the bottom of the gas/liquid separator 14 the height at which tube 13 is connected depends on many factors including the diameter of the separator, quantity of dispersion introduced, and rate of flow of the dispersion. The position of the inlet and outlet points of the tubes 13 and 16 on the periphery of the separator is not critical, provided, however, that the direction of movement of the liquid in tube 16 is the same as the direction of movement of the liquid in the separator. Owing to the speed acquired by the gas/liquid dispersion on arrival in the separator, the separation of the gas and the liquid is carried out in an effective manner.

In FIGURE 1 the gas is introduced through a connection 20. This connection can be provided with any conventional device, but a simple tube finishing flush with the wall co-axial with the dispersion tube is quite suitable. Its diameter can be relatively large, which reduces the risks of blockage, and it can be connected to a gas source and the gas can be introduced at or above atmospheric pressure. The rate at which gas is introduced into the apparatus can vary within fairly wide limits whilst ensuring very good gas/liquid contact. With gas flows of between 0.1 and 10 cubic metre per second and per square metre of cross-section of the tube 11, a fine and uniform dispersion of the gas in the liquid is obtained. For gas flows greater than 10 cubic metre per second and per square metre of cross-section of the tube 11, an annular flow of liquid on the walls is observed maintaining excellent gas/liquid contact and permitting high heat exchange coefficients to be obtained.

The liquid inlet 23 can be situated at any desired point on the separator or the return tube, the rate at which the liquid is introduced not being critical. The gas outlet connection 15 can be connected to any device for the treatment of the gases when separated from the liquid phase. To create the dispersion in the vertical tube 11, an excess quantity of gas is introduced at 20. In the gas/liquid separator the excess gas is separated from the liquid phase, carrying along the vapour of the liquid of the apparatus if appropriate, and possibly liquid droplets, or a gas formed during the course of gas/liquid contact. The excess gas can also carry along all these different materials from which it should be freed, if it is required for re-cycling.

Figure 3:
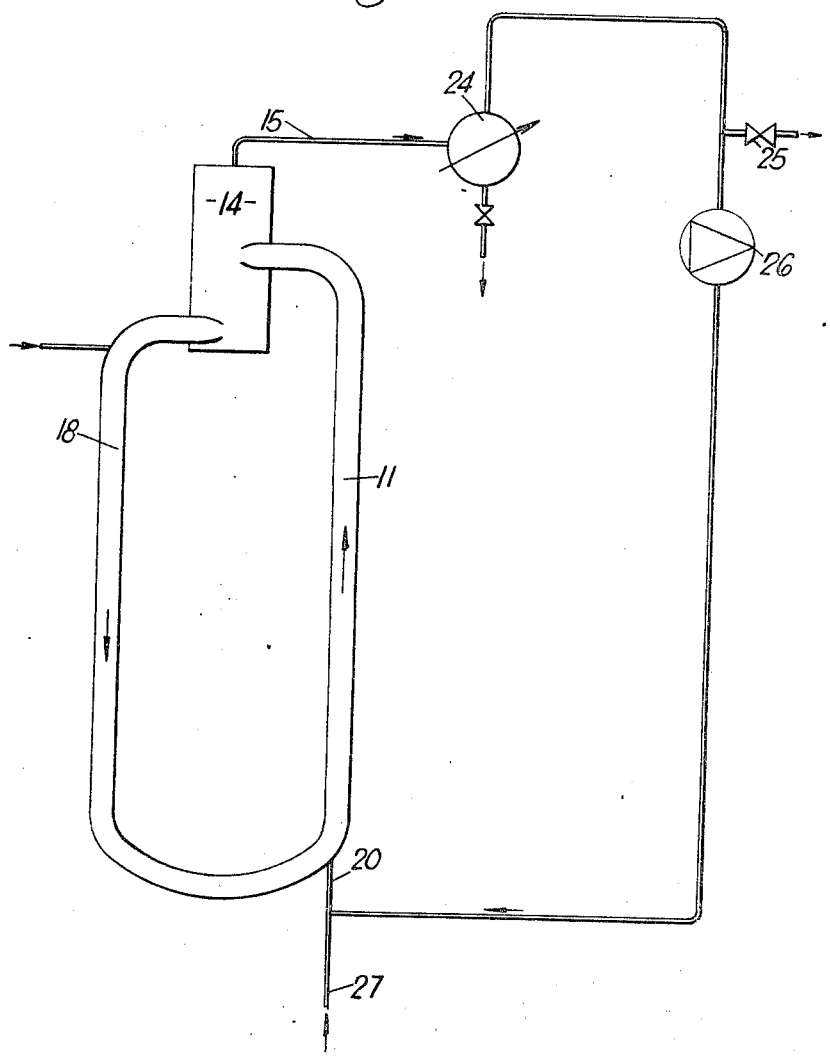
FIGURE 3 illustrates an apparatus similar to that shown in FIGURE 1, and connected to a circuit for the treatment of gaseous effluents.

FIGURE 3 illustrates an apparatus wherein the gases discharged from outlet 15 pass through a condenser 24 in which the vapours formed in the dispersion tube are separated from the gas introduced at 20. The condensate obtained can be re-cycled through the apparatus by a device (not shown), and the excess gas then passes through a conduit comprising a bleed system 25 into a compressor 26 and then is re-introduced at 20 after the introduction at 27 of a quantity of gas intended to compensate for that which is consumed during gas/liquid contact.

Where a liquid product is formed during the course of contact between gas and liquid, it may be necessary to withdraw partly the degasified reaction mass. This may be effected at any desired point on the circuit of the degasified liquid, and the withdrawn liquid replaced by an equivalent volume of liquid reagent, so as to maintain a constant volume of reagent, the supply of which is effected at a point situated downstream of the point at which the degasified liquid is withdrawn.

Figure 4:
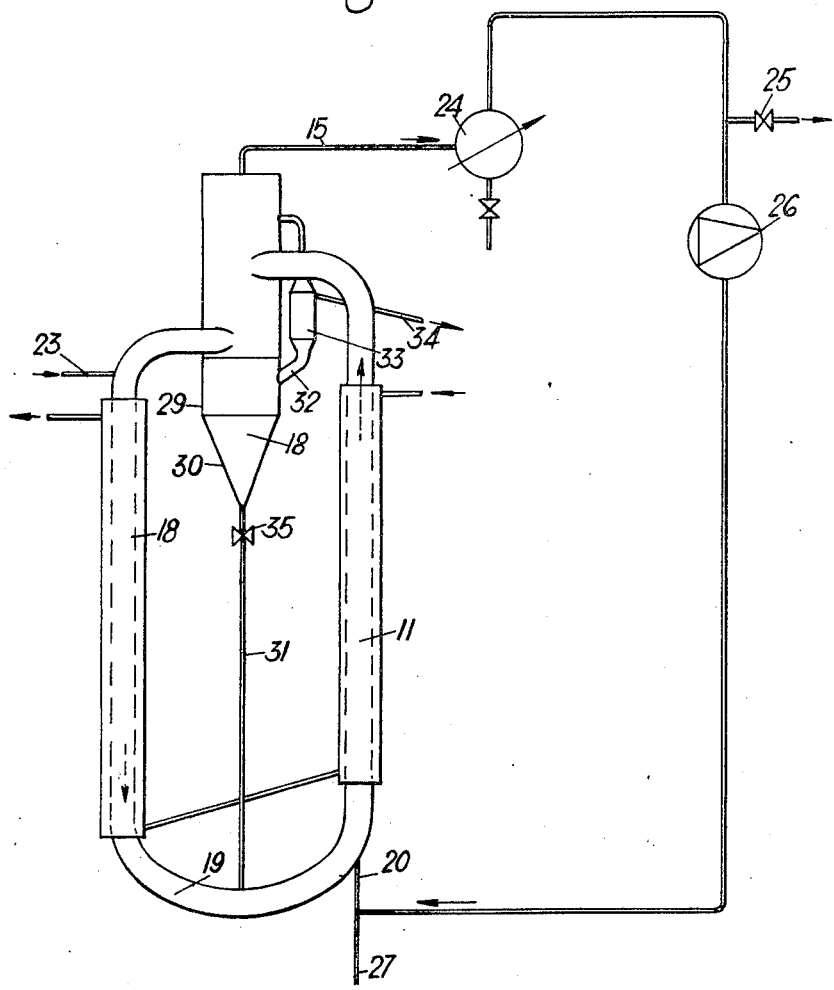
FIGURE 4 is a schematic side elevation of another embodiment of apparatus according to the invention, and incorporating a solid/liquid decanting apparatus.
Figure 5:
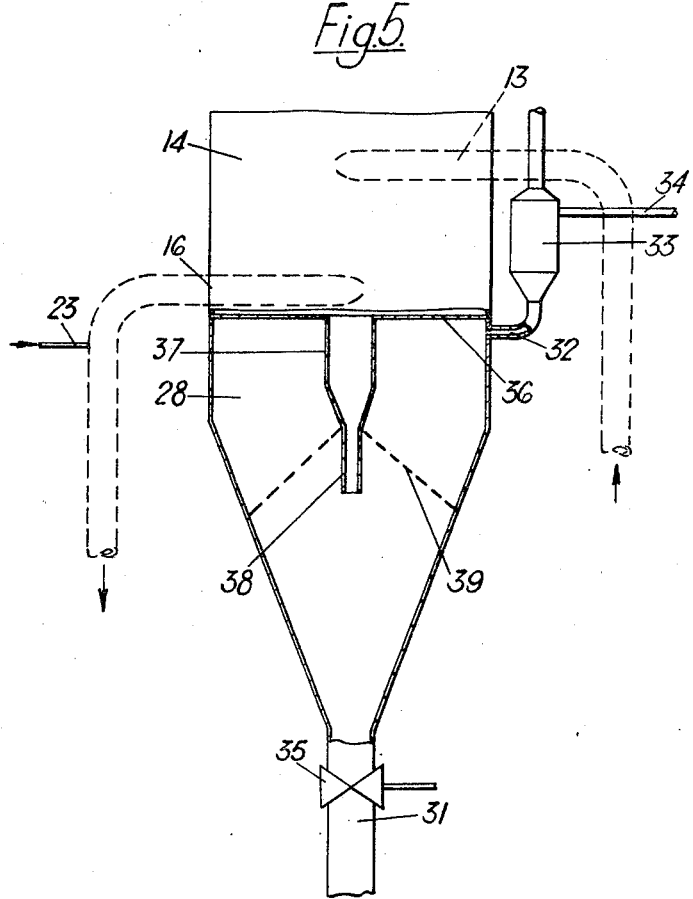
FIGURE 5 is an enlarged detailed view partly in section of a solid/liquid decanting apparatus of FIGURE 4.

If the gas/liquid contact takes place in the presence of a solid phase, for example a catalyst, in suspension in the liquid phase, it may be advantageous to be able to withdraw a clear liquid, leaving the solid within the apparatus. In this case it is advantageous to use a decanter 28 situated directly below the separator as shown in FIGURES 4 and 5. The solid/liquid suspension whose gaseous phase has been eliminated in the separator 14 enters the decanter 28, situated at the base of the separator.

The decanter comprises a cylinder 29 terminating in a cone 30. Concentrated solid liquid pulp is continuously fed back into the liquid phase upstream of the point at which the gaseous phase is introduced, through conduit 31. At the same time, the liquid freed from the solid passes through a conduit 32 connected to a chamber 33 provided with an overflow 34, whereby the clear liquid can be withdrawn continuously, the level throughout the apparatus being kept constant by continuous introduction of an equivalent volume of liquid reagent. The rate of flow in the tube 31 is regulated by means of a valve 35 so that the solid/liquid pulp maintains an adequate concentration.

FIGURE 5 illustrates in more detail a particular type of decanter which prevents firstly rapid movements of the mass of solid and liquid material from being propagated in the decanter 28, and secondly the gas from entering the decanter. A separation between the two zones is necessary, but this must not in any way be allowed to cause a solid deposit to form. The result is obtained by means of a partition 36 positioned between the separator 14 and the decanter 28, the flow between the gas/liquid separator and the decanter being by way of a conduit 37, the diameter of which is calculated to reduce considerably the speed of the liquid, for example, to a value less than 10 cm./sec. Conduit 37 is extended within the decanter as a reduced diameter tube 38. A conical wide-mesh metal screen 39 is situated within the decanter to reduce the turbulences created by the arrival of the solid/liquid pulp.

The decanter described above can be separate from the main chamber and connected thereby by a conduit for taking-off the solid/liquid suspension.

Figure 6:
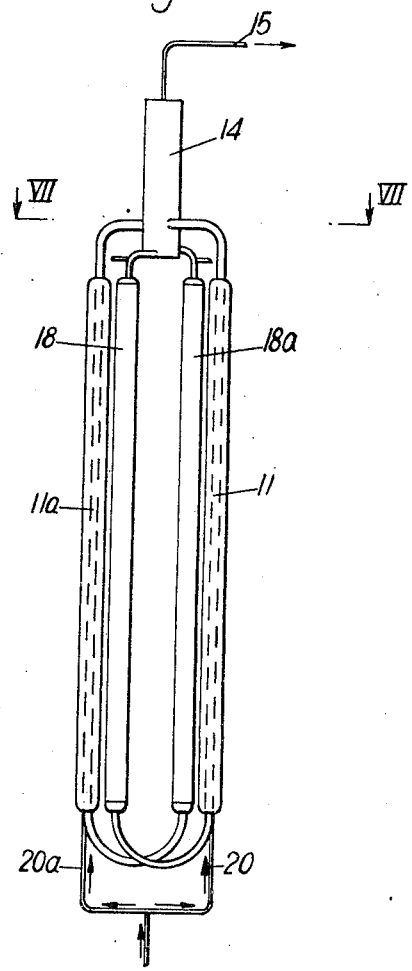
FIGURE 6 is a schematic side elevation of a further embodiment.
Figure 7:
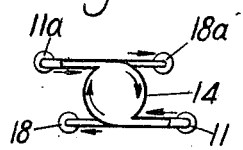
FIGURE 7 is a cross-section along the line VII—VII of FIGURE 6.

Another embodiment of apparatus according to the invention is illustrated in FIGURES 6 and 7, and comprises two dispersion tubes 11 and 11A and two return tubes 18 and 18A each having a jacket for fluid circulation. FIGURE 7 illustrates the position of the tubes 11, 11A, 18 and 18A and the movement of the liquid in the separator.

The apparatus which is the subject of the present invention is suitable both for chemical reactions between gases and liquids which may or may not take place in the presence of solids, and also for purely physical operations such as the evaporation of a liquid by a gas current or the absorption of a gas by a liquid. Indeed, the apparatus according to the invention makes it possible to obtain a dispersion of gas in the liquid in the form of very small bubbles. The dispersion obtained is stable and homogeneous throughout the entire height of the tube 11, and has a high contact surface between phases, which promotes the exchange of material between phases and heat exchange with the exterior. Furthermore, the fact that the dispersion of the gaseous phase is created simply by the turbulence of the liquid current makes it possible, for example, to inject directly into the apparatus, through the connection 20 normally provided for the gases, a liquid compound having a boiling point lower than that of the liquid in the apparatus. The compound introduced is then evaporated in the apparatus, producing a fine dispersion of vapours which effect the mechanical entrainment of the liquid.

The various advantages and features of the apparatus according to the invention will be illustrated in the following examples.

EXAMPLE 1

An apparatus as shown in FIGURE 4 was used, in which the vertical tube 11 was 10 cm. in diameter and 10 metres high. The separator 14 was 60 cm. in diameter and 1.5 metres in height, while the tube 18 was 10 cm. in diameter and 9.7 metres in height.

50 cubic metres/hour of air, measured at normal temperature and pressure, were introduced through tube 20, which was 20 mm. in diameter, while the apparatus contained 300 litres. It was found that the rate of flow of the liquid was 76 cubic metres/hour or 2.7 cubic metres per second and per square metre of cross-section of tube 11.

A fine and uniform dispersion of the gas in the liquid was obtained, no entrainment of liquid by gas being found to occur at the top of the separator.

EXAMPLE 2

An apparatus as shown in FIGURE 6 was used, in which tubes 11 and 11A were 10 cm. in diameter and 10 metres in height. The separator 14 was 60 cm. in diameter and 1.5 metres in height, while tubes 18 and 18A were 10 cm. in diameter and 9.4 metres high.

Below the separator was fitted a decanter as shown in FIGURE 5, the diameter of which was 36 cm. and the cylindrical portion of which was 285 mm. in height. The lower cone had an apex angle of 20°, and the conduit 31 was 30 mm. in diameter.

The conduit 37 had a diameter of 76 mm. and a length in its cylindrical portion of 275 mm., while the tube 38 was 36 mm. in diameter and 400 mm. in length. The screen 39 had an apex angle of 30°, and the conduit 32 was 30 mm. in diameter.

This apparatus was filled with 560 litres of a suspension in water of a finely divided solid the speed of sedimentation of which in water is 0.6 mm. per second, the concentration of solid in the suspension being 7% by weight. Air was fed at 28.5 cubic metres/hour to each tube 11 and 11A, and 200 litres per hour of water was fed into the upper portion of one of the tubes 18, 18A. This same volume of water was withdrawn at the top of the decanter.

It was found:
(1) that the rate of liquid flow in the return tubes was 74 cubic metres/hour per tube;
(2) that the gas was finely divided;
(3) that no solid deposit was formed in the apparatus; and
(4) that the solid concentration in the clear liquid issuing from the decanter was less than 0.1%.

EXAMPLE 3

An apparatus as shown in FIGURE 6 was used, the two tubes 11 and 11A being 100 mm. in diameter and 7 metres in height. The two tubes 18 and 18A were 70 mm. in diameter and 7 metres in height, while the separator 14 was 30 cm. in diameter and 1.25 metres high.

The apparatus was charged with 40 litres of water and air was introduced into the bottom of the two tubes 11 and 11A with a total flow rate of 2000 cubic metres/hour. It was found that the liquid recirculation flow rate was 13 cubic metres/hour in each tube 11, 11A.

An annular flow of liquid on the walls was observed in the tubes 11, 11A, the mean thickness of this liquid film being 5 mm.

In order to keep the level constant in the apparatus, it was necessary to introduce 115.4 litres of water continuously, the temperature of the gas at the outlet being 24.8° C.

The saturation rate of the gas at the pressure used in the tests was greater than 99% and the quantity of water entrained in the form of liquid droplets by the gas was 200 gms./hour.

We claim:
1. Gas-liquid contact apparatus, said apparatus comprising:
 (a) a gas-liquid separator chamber;
 (b) a gas outlet connected to the upper portion of said chamber;
 (c) at least one pair of approximately horizontal tubes connected to said chamber in a tangential direction, one of said tubes of a pair being connected to said chamber at a point higher than the other tube of said pair;
 (d) at least one U-tube;
 (e) a first and a second approximately vertical arm to each said U-tube;
 (f) a first elbow tube connecting the upper end of said first approximately vertical arm of each U-tube to said one of each pair of said approximately horizontal tubes;
 (g) a second elbow tube connecting the upper end of said second approximately vertical arm of each U-tube to said other of each pair of said approximately horizontal tubes;
 (h) gas inlet means connected to said first approximately vertical arms; and
 (i) separate liquid inlet means.

2. The apparatus specified in claim 1, wherein said separating chamber is a cylindrical chamber having its axis vertical.

3. The apparatus specified in claim 1 further including means for withdrawing liquid from the lower part of said separation chamber.

4. The apparatus specified in claim 3 and including decanter means connected to the separation chamber and to each U-tube.

5. The apparatus specified in claim 4 wherein the decanter comprises a vessel, a connecting duct communicating with the separation chamber and a conical grid within said chamber, said duct terminating below said conical grid.

(References on following page)

References Cited

UNITED STATES PATENTS

| | | | |
|---|---|---|---|
| 1,670,660 | 5/1928 | Haase et al. | 55—228 |
| 2,560,072 | 7/1951 | Bloomer | 261—79.1 X |
| 2,878,891 | 3/1959 | Ross et al. | 55—466 X |
| 3,105,778 | 10/1963 | Anderson | 261—79.1 X |
| 3,138,442 | 6/1964 | Krantz | 55—235 X |
| 3,203,156 | 8/1965 | McGregor et al. | 55—228 X |
| 3,238,021 | 3/1966 | Webber et al. | 261—79.1 X |
| 3,324,632 | 6/1967 | Berneike et al. | 261—79.1 |

FOREIGN PATENTS

| | | |
|---|---|---|
| 840,935 | 1/1939 | France. |
| 1,281,461 | 12/1961 | France. |
| 297,394 | 6/1954 | Switzerland. |

TIM R. MILES, Primary Examiner

U.S. Cl. X.R.

55—237; 261—8, 79, 151, 157